United States Patent [19]

Levine et al.

[11] Patent Number: 5,878,208

[45] Date of Patent: Mar. 2, 1999

[54] METHOD AND SYSTEM FOR INSTRUCTION TRACE RECONSTRUCTION UTILIZING LIMITED OUTPUT PINS AND BUS MONITORING

[75] Inventors: Frank Eliot Levine; William John Starke; Edward Hugh Welbon, all of Austin, Tex.

[73] Assignee: International Business Machines Corporation, Armonk, N.Y.

[21] Appl. No.: 758,197

[22] Filed: Nov. 25, 1996

[51] Int. Cl.[6] .................................................. G06F 11/00
[52] U.S. Cl. ................................................... 395/183.14
[58] Field of Search ....................... 395/183.14, 184.01, 395/568, 704, 183.21, 569; 364/148, 149, 221.2, 221.7, 267, 267.8, 550, 551.01, 916.3

[56] References Cited

U.S. PATENT DOCUMENTS

| | | | |
|---|---|---|---|
| 5,115,502 | 5/1992 | Tallman | 395/500 |
| 5,146,460 | 9/1992 | Ackerman et al. | 371/23 |
| 5,206,948 | 4/1993 | De Angelis et al. | 395/575 |
| 5,317,711 | 5/1994 | Bourekas et al. | 395/425 |
| 5,327,361 | 7/1994 | Long et al. | 364/488 |
| 5,388,233 | 2/1995 | Hays et al. | 395/375 |
| 5,440,722 | 8/1995 | Vanderspek et al. | 395/183.19 |
| 5,446,876 | 8/1995 | Levine et al. | 395/184.01 |
| 5,463,775 | 10/1995 | DeWitt et al. | 395/184.01 |
| 5,485,574 | 1/1996 | Bolosky et al. | 395/183.11 |
| 5,491,793 | 2/1996 | Somasundaram et al. | 395/183.21 |
| 5,513,317 | 4/1996 | Borchardt et al. | 395/183.21 |
| 5,519,848 | 5/1996 | Wloka et al. | 395/500 |
| 5,537,541 | 7/1996 | Wibecan | 395/183.21 |
| 5,557,548 | 9/1996 | Gover et al. | 364/551.01 |
| 5,724,505 | 5/1998 | Argade et al. | 395/183.21 |

FOREIGN PATENT DOCUMENTS 58-158750  9/1983  Japan .............................. G06F 11/30

Primary Examiner—Robert W. Beausoliel, Jr.
Assistant Examiner—Stephen C. Elmore
Attorney, Agent, or Firm—Casimer K. Salys; Andrew J. Dillon

[57] ABSTRACT

Performance projections for processor systems and memory subsystems are important for a correct understanding of work loads within the system. An instruction trace is generally utilized to determine distribution of instructions, identification of register dependencies, branch path analyses and timing. One well known technique for reconstructing an instruction trace can be accomplished by monitoring bus traffic to determine address traces, data addresses and data during the trace, if the initial architectural state is known. The difficulty in reconstructing an instruction trace from monitored bus traffic can be decreased substantially if more definitive information regarding the actual instruction sequence can be obtained. An internal performance monitor within the processor system is utilized to detect each occurrence of the execution of a specified number of instructions and each occurrence of the execution of a specified number of some specific type of instruction such as load instructions or store instructions and generate an output in response to each such occurrence. This information, in addition to each detected occurrence of an external interrupt, is then utilized in combination with the monitored bus traffic to reconstruct an instruction trace utilizing a limited number of output pins.

14 Claims, 5 Drawing Sheets

METHOD AND SYSTEM FOR INSTRUCTION TRACE RECONSTRUCTION UTILIZING LIMITED OUTPUT PINS AND BUS MONITORING

CROSS REFERENCE TO RELATED APPLICATIONS

The present application is related to co-pending applications Ser. No. 08/758,198 (AT9-96-157) and Ser. No. 08/758,196 (AT9-96-159) which are assigned to the assignee herein named and which are filed of even date herewith. The content of those co-pending applications are incorporated herein by reference thereto.

BACKGROUND OF THE INVENTION

1. Technical Field

The present invention relates in general to an improved method and system for instruction trace reconstruction in a data processing system and in particular to an improved method and system for instruction trace reconstruction utilizing a performance monitor. Still more particularly, the present invention relates to an improved method and system for instruction trace reconstruction in a data processing system utilizing a limited number of performance monitor output pins.

2. Description of the Related Art

Data processing systems in recent years have been improved on a continuous and highly accelerated basis. Whether the improvements to such data processing systems are software related or hardware related, it is important for a developer to have some expectation of the performance of a new system under construction before that system is actually completely developed. In order to make this evaluation of an expected new system or changes to a current system, various techniques are known. Many different approaches have been utilized within the computer industry in order to understand and characterize those parameters which can be utilized to predict the value associated with a proposed set of changes. One particular approach is a full system software simulation of the entire system, including all of the system devices and the system software, accesses to data stored within a direct access storage device. A complete system simulation approach requires an extremely significant investment in software and has the drawback that the time required to run such a simulation is extremely long. Another approach utilized by developers is an effort to develop accurate, "representative instruction traces" which permit the use of a simplified system model in order to predict the performance of the new system.

Performance projections for processors and memory subsystems are critically dependent upon a correct understanding of the workloads which are imposed on such systems. In order to accurately predict the performance of a proposed system and assist in selecting among the various designed trade-offs, it is necessary to collect instruction streams (i.e., "traces") that statistically represent actual workloads. By utilizing traces which represent a fixed workload as input to a system model that allows variations on some hardware parameter, such as the number of processors, developers hope to be able to predict performance for that workload with a different number of processors.

One known software approach to developing an instruction and address trace is the so-called "single-step" mechanism, where a single step interrupt handler is executed immediately before or after an instruction is executed. The interrupt handler may then decode the instruction and write the pertinent information regarding that instruction to a trace buffer. The trace buffer may be provided within system memory or may be in a special hardware buffer. The hardware buffer approach is often implemented by having the interrupt handler write the relevant information at a specific address on the processor bus which is then captured by a bus monitor looking for data at that address.

Another known variation is the execution of software in a simulation model. The simulation mode works well on so-called RISC systems such as the RISC System/6000 machine running AIX or other suitable software for constructing application traces. Such an approach does have several drawbacks if it is utilized in an attempt to capture kernel traces as well. In a typical implementation that supports the capturing of kernel traces, the code is updated or "instrumented" to provide relevant information as part of the tracing process. When software approaches like these are utilized that include kernel activities, it is very important to provide some type of compensation to reflect the fact that the system timings have been perturbed. For example, there may be a much larger number of timer ticks executed than would normally be utilized and thus, the ratio of external interrupts to code being executed is similarly affected. Compensating for such timing changes may be fairly reasonable for benchmarks that are not utilizing many kernel services and/or external interrupts.

Instruction and address traces which are constructed via software instrumentation techniques can be very invasive and often severely affect the system under test. Traces produced in this manner are very time consuming, but they provide information required for fairly simple application (problem state) intensive benchmarks, where the kernel accesses are negligible. However, traces developed under conditions where the software is instrumented, are not typically considered suitably representative to characterize extremely dynamic work loads which access kernel services, such as those found in On-Line Transaction Processing (OLTP) work loads. Full system simulation approaches avoid these problems, but require an extreme investment in both software and in the time the simulation requires to run.

One technique for providing traces utilizes the processor to externalize information about what is going on inside the processor via signals or pins which can be monitored from outside the processor. A simple instruction trace can be externalized in a very straightforward manner by simply putting out the actual instruction being executed on every processor cycle. An operand address trace can be externalized by putting out the operand address on such pins. By understanding the content of the processor's internal buffers, encoded information may then be utilized to identify the operand addresses. That is, for example, signals can be utilized to identify a hit or a miss in the processor's cache or translation lookaside buffer (TLB). In case of a hit, encoded information, such as an index into the internal buffer, can be utilized to capture and construct virtual address traces. In the event of a miss, more cycles are available to give the actual address (either real or virtual) of the operand of the instructions. Both of these approaches have the drawback of requiring many pins and, as a practical matter, may be difficult to support at full speed. The processor support required may be difficult to implement due to out-of-order execution and superscalar designs with multiple instructions being dispatched and completing on a single cycle. Capturing of the data is also difficult due to the increasing speeds of modern processors. In order to actually support this approach, the speed of the processor and/or the system may have to be reduced and the processor may have to run in a single instruction issue mode.

Thus, while it is well known that a representative instruction trace may be provided for a system under test by attempting the reconstruction of an actual instruction sequence utilizing instruction and address data monitored on the system bus, the problem of determining the actual instruction trace efficiently without requiring a large number of output pins is also well known. Consequently, those skilled in the art will appreciate that a need exists for an improved method and system for instruction trace reconstruction utilizing a limited number of processor system output pins.

SUMMARY OF THE INVENTION

It is therefore one object of the present invention to provide an improved method and system for instruction trace reconstruction in a data processing system.

It is another object of the present invention to provide an improved method and system for instruction trace reconstruction utilizing a performance monitor.

It is yet another object of the present invention to provide an improved method and system for instruction trace reconstruction in a data processing system utilizing a limited number of performance monitor output pins.

The foregoing objects are achieved as is now described. A method and system are disclosed for instruction trace reconstruction utilizing limited output pins and bus monitoring. Performance projections for processor systems and memory subsystems are important for a correct understanding of work loads within the system. An instruction trace is generally utilized to determine distribution of instructions, identification of register dependencies, branch path analyses and timing. One well known technique for reconstructing an instruction trace can be accomplished by monitoring bus traffic to determine address traces, data addresses and data during the trace, if the initial architectural state is known. The difficulty in reconstructing an instruction trace from monitored bus traffic can be decreased substantially if more definitive information regarding the actual instruction sequence can be obtained. An internal performance monitor within the processor system is utilized to detect each occurrence of the execution of a specified number of instructions and each occurrence of the execution of a specified number of some specific type of instruction, such as load instructions or store instructions, and generate an output in response to each such occurrence. This information, in addition to each detected occurrence of an external interrupt, is then utilized in combination with the monitored bus traffic to reconstruct an instruction trace utilizing a limited number of output pins.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
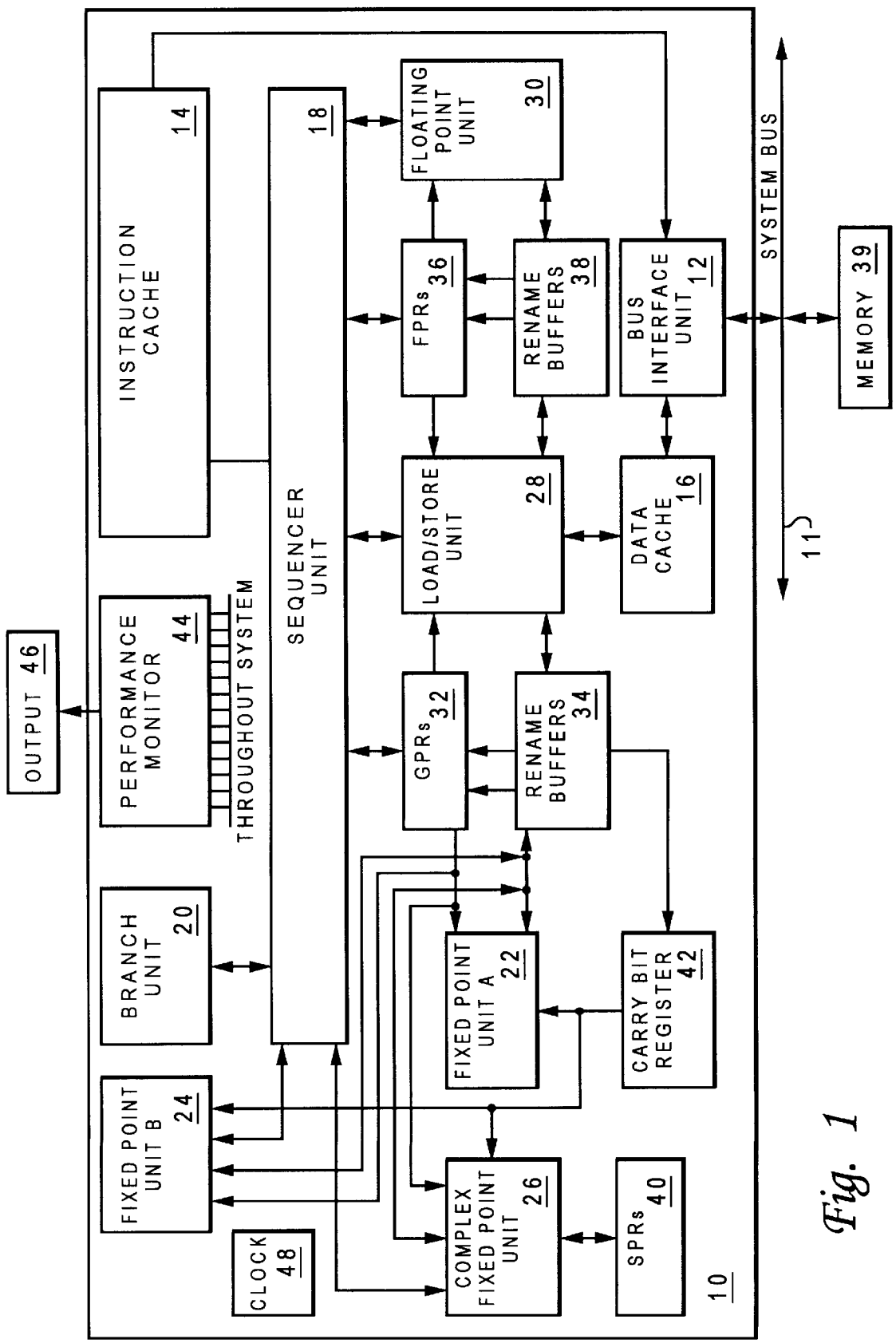
FIG. 1 is a high level block diagram of a processor system which may be utilized to implement the method and system of the present invention.

FIG. 1 is a block diagram of a processor 10 system for processing information according to the illustrative embodiment. In the illustrative embodiment, processor 10 is a single integrated circuit superscalar microprocessor. Accordingly, as discussed further hereinbelow, processor 10 includes various processor assets including execution units, registers, buffers, memories, and other sections, all of which are formed by integrated circuitry. Also, in the illustrative embodiment, processor 10 operates according to reduced instruction set computing ("RISC") techniques. As shown in FIG. 1, a system bus 11 is connected to a bus interface unit ("BIU") 12 of processor 10. BIU 12 controls the transfer of information between processor 10 and system bus 11.

BIU 12 is connected to an instruction cache 14 and to a data cache 16 of processor 10. Instruction cache 14 outputs instructions to a sequencer unit 18. In response to such instructions from instruction cache 14, sequencer unit 18 selectively outputs instructions to other execution circuitry of processor 10.

In addition to sequencer unit 18, in the illustrative embodiment the execution circuitry of processor 10 includes multiple execution units, namely a branch unit 20, a fixed point unit A ("FXUA") 22, a fixed point unit B ("FXUB") 24, a complex fixed point unit ("CFXU") 26, a load/store unit ("LSU") 28 and a floating point unit ("FPU") 30. FXUA 22, FXUB 24, CFXU 26 and LSU 28 input their source operand information from general purpose architectural registers ("GPRs") 32 and fixed point rename buffers 34. Moreover, FXUA 22 and FXUB 24 input a "carry bit" from a carry bit ("CA") register 42. FXUA 22, FXUB 24, CFXU 26 and LSU 28 output results (destination operand information) of their operations for storage at selected entries in fixed point rename buffers 34. Also, CFXU 26 inputs and outputs source operand information and destination operand information to and from special purpose registers ("SPRs") 40.

FPU 30 inputs its source operand information from floating point architectural registers ("FPRs") 36 and floating point rename buffers 38. FPU 30 outputs results (destination operand information) of its operation for storage at selected entries in floating point rename buffers 38.

In response to a Load instruction, LSU 28 inputs information from data cache 16 and copies such information to selected ones of rename buffers 34 and 38. If such information is not stored in data cache 16, then data cache 16 inputs (through BIU 12 and system bus 11) such information from a system memory 39 connected to system bus 11. Moreover, data cache 16 is able to output (through BIU 12 and system bus 11) information from data cache 16 to system memory 39 connected to system bus 11. In response to a Store instruction. LSU 28 inputs information from a selected one of GPRs 32 and FPRs 36 and copies such information to data cache 16.

Sequencer unit 18 inputs and outputs information to and from GPRs 32 and FPRs 36. From sequencer unit 18, branch unit 20 inputs instructions and signals indicating a present state of processor 10. In response to such instructions and signals, branch unit 20 outputs (to sequencer unit 18) signals indicating suitable memory addresses storing a sequence of instructions for execution by processor 10. In response to such signals from branch unit 20, sequencer unit 18 inputs the indicated sequence of instructions from instruction cache 16. If one or more of the sequence of instructions is not stored in instruction cache 14, then instruction cache 14 inputs (through BIU 12 and system bus 11) such instructions from system memory 39 connected to system bus 11.

In response to the instructions input from instruction 14, sequencer unit 18 selectively dispatches the instructions to selected ones of execution units 20, 22, 24, 26, 28, and 30. Each execution unit executes one or more instructions of a particular class of instructions. For example, FXUA 22 and FXUB 24 execute a first class of fixed point mathematical operations on source operands, such as addition, subtraction, ANDing, ORing and XORing. CFXU 26 executes a second class of fixed point operations on source operands, such as fixed point multiplication and division. FPU 30 executes floating point operations on source operands, such as floating point multiplication and division.

As information is stored at a selected one of rename buffers 34, such information is associated with a storage location (e.g. one of GPRs 32 or CA register 42) as specified by the instruction for which the selected rename buffer is allocated. Information stored at a selected one of rename buffers 34 is copied to its associated one of GPRs 32 (or CA register 42) in response to signals from sequencer unit 18. Sequencer unit 18 directs such copying of information stored at a selected one of rename buffers 34 in response to "completing" the instruction that generated the information. Such copying is called "writeback".

As information is stored at a selected one of rename buffers 38, such information is associated with one of FPRs 36. Information stored at a selected one of rename buffers 38 is copied to its associated one of FPRs 36 in response to signals from sequencer unit 18. Sequencer unit 18 directs such copying of information stored at a selected one of rename buffers 38 in response to "completing" the instruction that generated the information.

Processor 10 achieves high performance by processing multiple instructions simultaneously at various ones of execution units 20, 22, 24, 26, 28, and 30. Accordingly, each instruction is processed as a sequence of stages, each being executable in parallel with stages of other instructions. Such a technique is called "pipelining". In a significant aspect of the illustrative embodiment, an instruction is normally processed as six stages, namely fetch, decode, dispatch, execute, completion, and writeback.

In the fetch stage, sequencer unit 18 selectively inputs (from instructions cache 14) one or more instructions from one or more memory addresses storing the sequence of instructions discussed in connection with branch unit 20 and sequencer unit 18.

In the decode stage, sequencer unit 18 decodes up to four fetched instructions.

In the dispatch stage, sequencer unit 18 selectively dispatches up to four decoded instructions to selected (in response to the decoding in the decode stage) ones of execution units 20, 22, 24, 26, 28, and 30 after reserving rename buffer entries for the dispatched instructions' results (destination operand information). In the dispatch stage, operand information is supplied to the selected execution units for dispatched instructions. Processor 10 dispatches instructions in order of their programmed sequence.

In the execute stage, execution units execute their dispatched instructions and output results (destination operand information) of their operations for storage at selected entries in rename buffers 34 and rename buffers 38 as discussed further hereinabove. In this manner, processor 10 is able to execute instructions out-of-order relative to their programmed sequence.

In the completion stage, sequencer unit 18 indicates an instruction is "complete". Processor 10 "completes" instructions in order of their programmed sequence.

In the writeback stage, sequencer 18 directs the copying of information from rename buffers 34 and 38 to GPRs 32 and FPRs 36, respectively. Sequencer unit 18 directs such copying of information stored at a selected rename buffer. Likewise, in the writeback stage of a particular instruction, processor 10 updates its architectural states in response to the particular instruction. Processor 10 processes the respective "writeback" stages of instructions in order of their programmed sequence. Processor 10 advantageously merges an instruction's completion stage and writeback stage in specified situations.

In the illustrative embodiment, each instruction requires one machine cycle to complete each of the stages of instruction processing. Nevertheless, some instructions (e.g., complex fixed point instructions executed by CFXU 26) may require more than one cycle. Accordingly, a variable delay may occur between a particular instruction's execution and completion stages in response to the variation in time required for completion of preceding instructions.

Also depicted within processor 10 is performance monitor 44. Performance monitor 44 is utilized, in a manner well known to those having ordinary skill in the art, to optimize the performance of a data processing system. Timing data from the performance monitor may be utilized to optimize programs. In addition, performance monitor 44 may be utilized to gather data about access times from system caches and main memories and, monitor performance of the various units within processor 10.

In a common utilization of performance monitor 44, performance monitor 44 is coupled to FXUA 22, FXUB 24, CFXU 26, LSU 28, BIU 12, branch unit 20, instruction cache 14, data cache 26, sequencer unit 18, FPU 30, and various registers within processor 10 system. Various outputs generated within performance monitor 44 are coupled to output 46, commonly referred to as a "debug" port.

For a further discussion of the use of performance monitoring within a superscalar data processing system, see U.S. Pat. No. 5,557,548, issued to certain of the inventors herein named and assigned to the assignee of the present application.

Finally, clock 48 is depicted schematically within FIG. 1. Clock 48 is utilized to provide processor clock cycles to the various units within processor 10 system.

Figure 2:
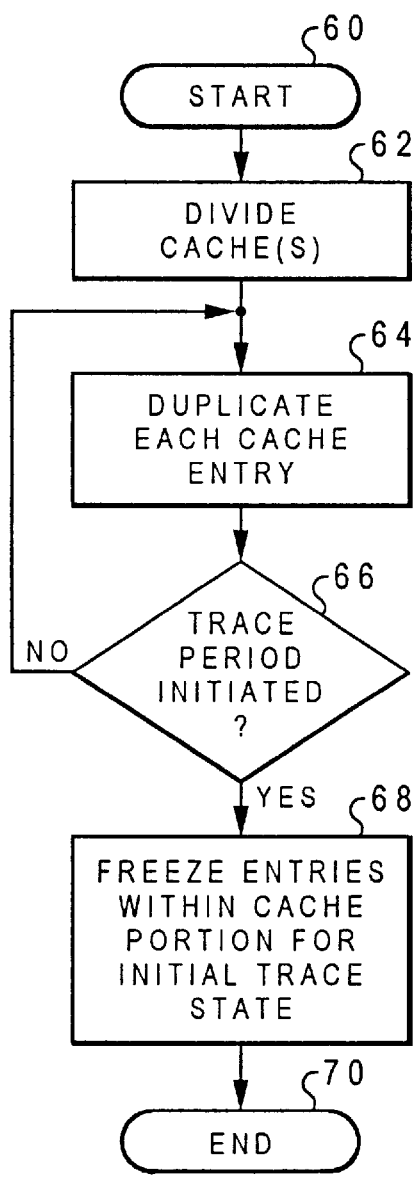
FIG. 2 is a high level logic flow chart illustrating a method for determining an initial state of a cache memory within the processor system of FIG. 1 in accordance with the method and system of the present invention.

Referring to FIG. 2, there is depicted a high-level flow chart which illustrates one method for determining an initial state of a cache memory within processor 10 system of FIG. 1. As depicted, this process begins at block 60 thereafter passes to block 62. Block 62 depicts the dividing of a cache into two portions. For purposes of illustration, both instruction cache 14 and data cache 16 may be so divided. The utilization of this technique provides an indication of the initial state of a cache upon the initiation of an instruction trace, without requiring the time necessary to invalidate an entire cache and refill that cache with appropriate data at the time of the instruction trace.

Next, the process passes to block 64. Block 64 illustrates the duplication of each new cache entry within the system during processing of instructions in order to replace invalidated entries in each half, such that upon initiation of an instruction trace, the cache halves are already filled with valid data. That is, in a manner which will be illustrated in greater detail herein, each new cache entry made is duplicated within each portion of the divided cache.

Next, the process passes to block 66. Block 66 illustrates a determination of whether or not the trace period has been initiated and if not, the process returns to block 64, in an iterative fashion, to continue duplicating each cache entry.

Still referring to block 66, in the event the trace period has been initiated, the process passes to block 68. Block 68 depicts the freezing of the entries within one cache portion in order to accurately determine the initial trace state of that cache. The process then passes to block 70 and terminates.

Upon reference to the foregoing, those skilled in the art will appreciate that by dividing one or more caches in half, prior to initiation of an instruction trace, and then refilling both halves before initiating an instruction trace, in the manner depicted within FIG. 2, the perturbing effect of invalidating the caches during an instruction trace is avoided. This may be accomplished by utilizing a system in which the system is designed to operate in a mode wherein only one half of the cache is utilized. In such a case, a simple enhancement may be provided, for internal use, which supports a signal which writes the same data, including directory data, to the normally "unused" portion of the cache. Thereafter, when that signal changes states, data will no longer be written to that portion of the cache, thus preserving the initial state of the cache. This data may then be retrieved via an appropriate interface.

Figure 3:
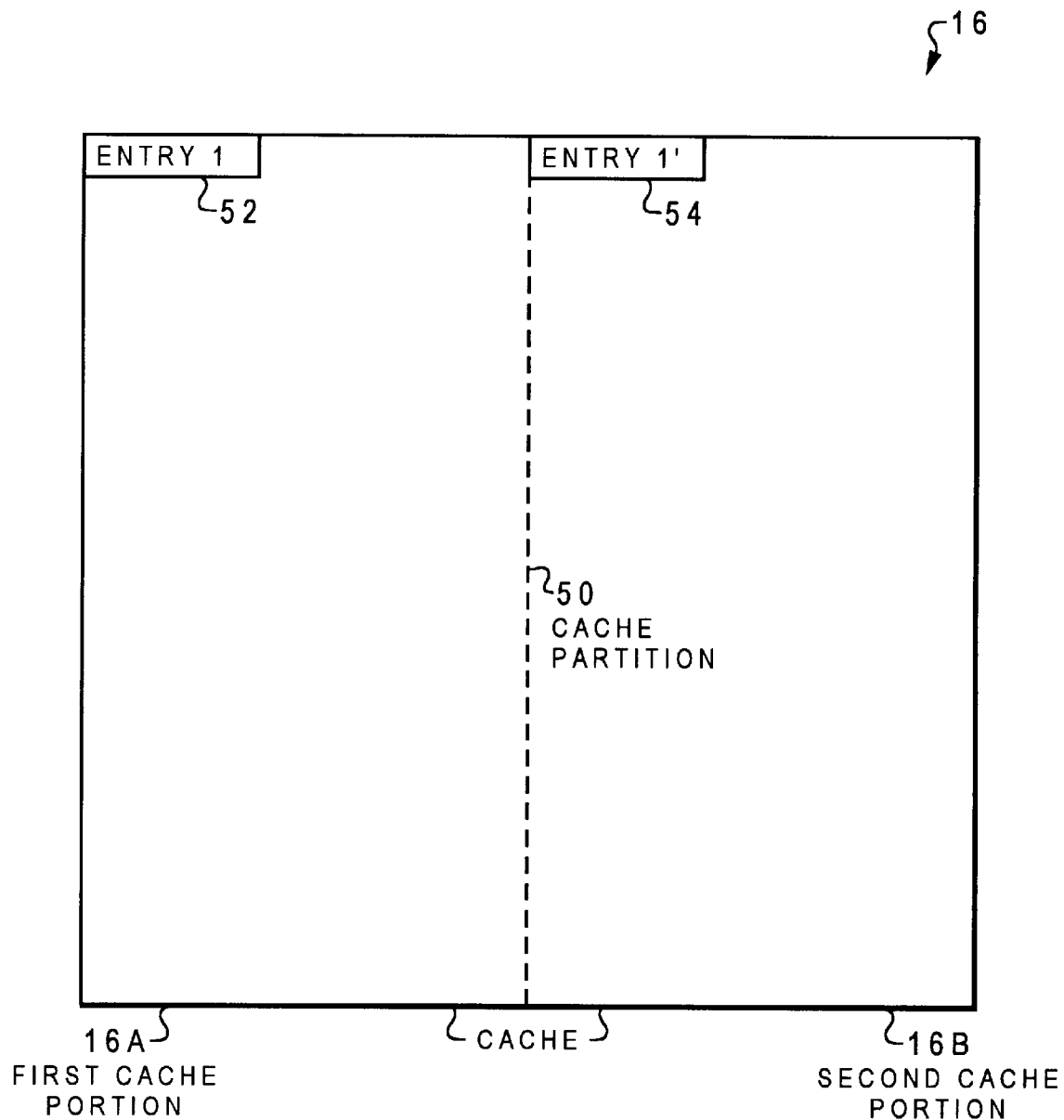
FIG. 3 is a schematic representation of a divided cache memory which may be utilized to implement the method and system of the present invention.

This process of dividing the cache is schematically depicted within FIG. 3 which illustrates a digital cache memory which may be utilized to implement the method and system of the present invention. As depicted, cache 16 is divided into a first portion, 16A and a second portion, 16B by means of a partition 50 and both halves of the cache are either cleared or invalidated. Thereafter, each time an entry, such as entry 52, is written into cache portion 16A, an identical entry, entry 54, is written into cache portion 16B. Thus, after a sufficient period of operation, cache 16B will in effect be a "shadow" of cache 16A. Thereafter, upon the initiation of an instruction trace, the duplication of cache entries is terminated and the content of cache portion 16B will represent an accurate depiction of the initial state of the cache which may then be utilized to reconstruct an instruction trace.

Figure 4A:
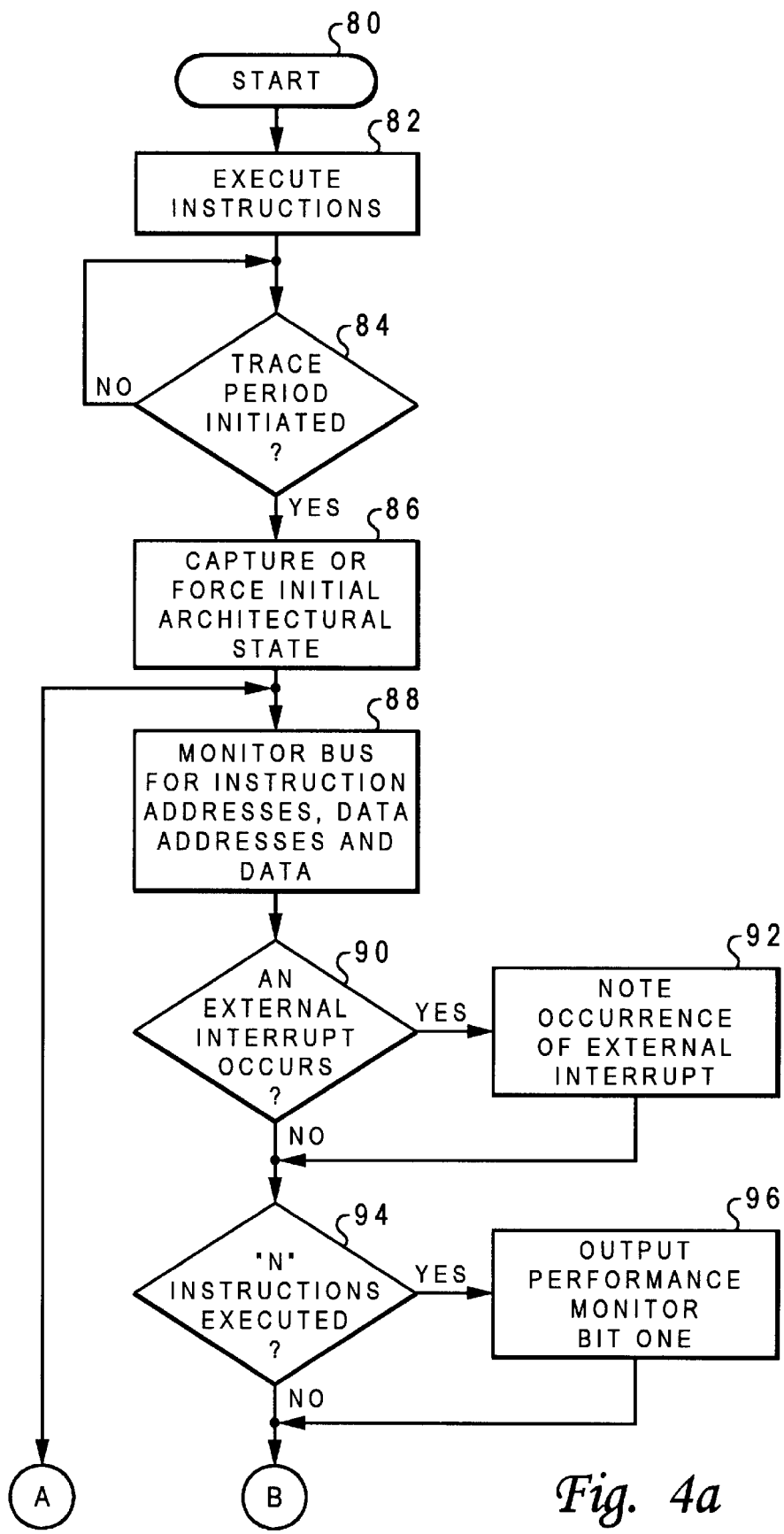
FIGS. 4A and 4B together form a high level logic flow chart illustrating a method for instruction trace reconstruction in accordance with the method of the present invention.
Figure 4B:
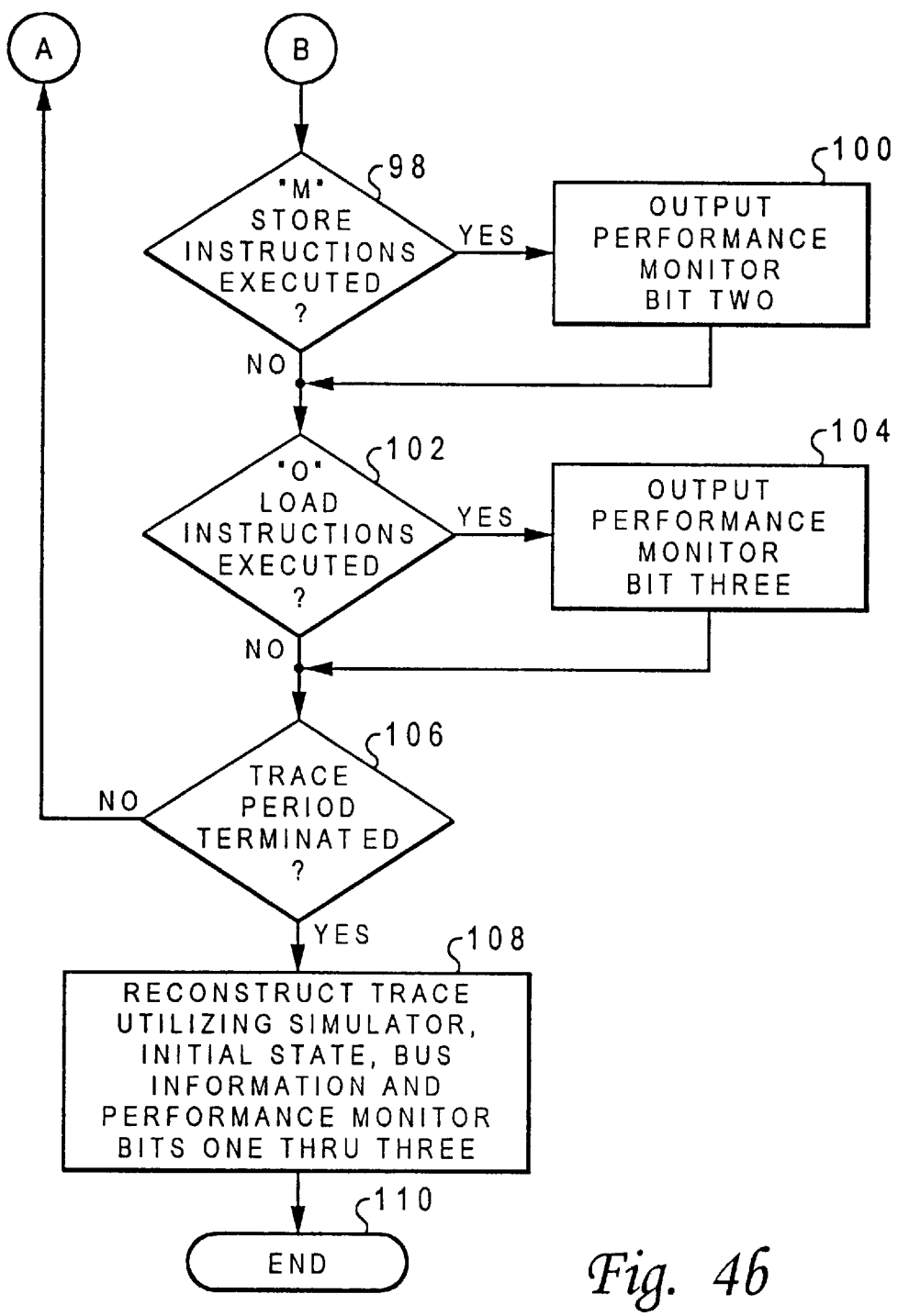

Finally, referring to FIGS. 4A and 4B, there is depicted a high level logic flow chart which illustrates a method for instruction trace reconstruction in accordance with the method and system of the present invention. As depicted, this process begins at block 80.

Next, the process passes to block 82. Block 82 illustrates the execution of instructions. It should be noted that during this period of time the content of the cache will be duplicated, as illustrated within FIG. 3.

Next, as depicted in block 84, a determination occurs as to whether or not a trace period has been initiated. If not, the process merely iterates until the trace period initiates.

Still referring to block 84, in the event a trace period has been initiated the process passes to block 86. Block 86 illustrates the forcing or capturing of the initial architectural state. As described above, the initial state for one or more caches within the system may be captured by freezing entries within the duplicate portion of each cache such that the initial state may be captured for future use. Similarly, the content of architected registers and buffers may be copied or invalidated such that the content of those registers and buffers becomes a known initial state.

Next, block 88 illustrates the monitoring of the system bus for instruction addresses, data addresses and data. Thereafter, as illustrated at block 90, a determination is made as to whether or not an external interrupt has occurred. If so, the process passes to block 92 and the occurrence of the external interrupt is noted for use in reconstructing the instruction trace at a later time, as will be explained in greater detail herein.

Next, after noting the occurrence of an external interrupt, or if an external interrupt has not occurred, the process passes to block 94. Block 94 depicts a determination of whether or not "N" instructions have been executed. If so, the process passes to block 96 and a single bit signal is output from the performance monitor. In this manner, as those ordinarily skilled in the art will appreciate, a single bit may be utilized to indicate the execution of some predetermined number of instructions, such as every sixteen instructions. Thus, when attempting to reconstruct the instruction trace, the count of instructions which have been executed may be utilized in order to ascertain which instruction path has actually occurred during the instruction sequence.

Still referring to block 94, in the event "N" instructions have not been executed at this time, the process passes to block 98. Block 98 illustrates a determination of whether or not "M" store instructions have been executed. In the manner similar to that described above, if "M" store instructions have been executed, the process passes to block 100 which illustrates the output of a signal from the performance monitor at a second selected bit, each time "M" store instructions have been executed. As above, an output can be generated each time sixteen store instructions have been executed.

Still referring to block 98, in the event "M" store instructions have not been executed at this time, the process passes to block 102. Block 102 depicts a determination of whether or not "O" load instructions have been executed. In an identical manner to that described above, in the event "O" load instructions have been executed, the process passes to block 104. Block 104 illustrates the outputting of a third bit signal from the performance monitor, indicating that "O" load instructions have been executed. Once again, in the depicted embodiment of the present invention, the performance monitor generates an output each time sixteen load instructions have been executed.

While the present description utilizes a count of load instructions and store instructions, those having skill in the art, upon reference to the foregoing, will appreciate that a count of the total instructions executed, along with a count of the number of executions of any specific type of instruction, can be utilized to reconstruct an instruction trace in the manner described herein.

Referring again to block 102, in the event "O" load instructions have not been executed during this period, the process passes to block 106. Block 106 illustrates a determination of whether or not the trace period has terminated and if not, the process returns, in an iterative fashion, to block 88 to continue the process of monitoring the bus for instruction addresses, data addresses and data and the continued monitoring for the occurrence of external interrupts, the occurrence of a selected number of instructions being executed, the occurrence of a selected number of store instructions being executed and the occurrence of a selected number of load instructions being executed.

Still referring to block 106, in the event the trace period has terminated, the process passes to block 108. Block 108 illustrates the reconstruction of the instruction trace utilizing a simulator, the initial architectural state, the monitored bus information and the three bit output of the performance monitor. While this data does not identify the exact number of instructions executed and the exact paths taken, a reconstructed trace may still be created which correlates with the bus data which has been monitored. Trace reconstruction software can be utilized which can detect an anomalous path and redo the trace reconstruction utilizing an alternate path in response to such detection. Having available the three output pins of the performance monitor which indicate the occurrence of the execution of each group of instructions, load instructions and store instructions create a situation in which an instruction trace reconstruction can be created by either looking ahead through the proposed instruction trace to correlate that instruction trace with the number of instructions, load instructions and store instructions which are executed, or by restarting the entire trace reconstruction in a so-called "backup and restart" approach to choose a different path at those locations which are suspect within an originally derived trace.

After the reconstruction of an instruction trace in a manner described above, the process passes to block 110 and terminates.

Upon reference to the foregoing, those skilled in the art will appreciate that the Applicants herein have provided a technique whereby an instruction trace reconstruction may be created utilizing a limited number of output pins and data monitored from the system bus in a manner which is highly efficient and minimally invasive to the process understudy.

While the invention has been particularly shown and described with reference to a preferred embodiment, it will be understood by those skilled in the art that various changes in form and detail may be made therein without departing from the spirit and scope of the invention.

We claim:

1. A method of tracing the execution of a plurality of instructions within a processor system which includes a processor, a main memory, a cache memory and a bus interconnecting elements within said processor system, said method comprising the steps of:

executing a series of instructions;

initiating an instruction trace;

in response to said initiation of said instruction trace, determining an initial state of said cache memory and monitoring subsequent instruction addresses, data addresses and data on said bus;

monitoring an occurrence of each external interrupt which occurs within said processor system;

detecting each occurrence of the execution of a predetermined number of instructions and each occurrence of the execution of a predetermined number of a specific type of instruction a single bit providing an output in response to each such detection; and thereafter, executing an instruction trace utilizing said monitored instruction addresses, data addresses and data, said initial state of said cache memory and said outputs.

2. The method of tracing the execution of a plurality of instructions within a processor system according to claim 1, wherein said step of detecting each occurrence of the execution of a predetermined number of a specific type of instruction comprises the step of detecting each occurrence of the execution of a predetermined number of load instructions.

3. The method of tracing the execution of a plurality of load instructions within a processor system according to claim 2, wherein said step of detecting each occurrence of the execution of a predetermined number of load instructions comprises the step of detecting each occurrence of the execution of sixteen load instructions.

4. The method of tracing the execution of a plurality of instructions within a processor system according to claim 1, wherein said step of detecting each occurrence of the execution of a predetermined number of a specific type of instruction comprises the step of detecting each occurrence of the execution of a predetermined number of store instructions.

5. The method of tracing the execution of a plurality of store instructions within a processor system according to claim 4, wherein said step of detecting each occurrence of the execution of a predetermined number of store instructions comprises the step of detecting each occurrence of the execution of sixteen store instructions.

6. The method of tracing the execution of a plurality of instructions within a processor system according to claim 1, wherein said step of determining an initial state of said cache memory comprises the step of invalidating said cache memory in response to said initiation of said instruction trace.

7. The method of tracing the execution of a plurality of instructions within a processor system according to claim 1, wherein said processor system further includes a plurality of registers and buffers and wherein said method further includes the step of:

copying the content of at least selected ones of said plurality of buffers and registers in response to said initiation of said instruction trace.

8. The method of tracing the execution of a plurality of instructions within a processor system according to claim 1, wherein said step of detecting each occurrence of the execution of a predetermined number of instructions comprises the step of detecting each occurrence of the execution of sixteen instructions.

9. A system for tracing the execution of a plurality of instructions within a processor system which includes a processor, a main memory, a cache memory and a bus interconnecting elements within said processor system, said system comprising:

means for executing a series of instructions;

means for initiating an instruction trace;

determining an initial state of said cache memory and monitoring subsequent instruction addresses, data addresses and data on said bus in response to said initiation of said instruction trace;

means for monitoring an occurrence of each external interrupt which occurs within said processor system; and a performance monitor for detecting each occurrence of the execution of a predetermined number of instructions and each occurrence of the execution of a predetermined number of a specific type of instruction, and for providing a single bit output in response to each such detection.

10. The system for tracing the execution of a plurality of instructions within a processor system according to claim 9, wherein said means for determining an initial state of said cache memory comprises means for invalidating said cache memory in response to said initiation of said instruction trace.

11. The system for tracing the execution of a plurality of instructions within a processor system according to claim 9, wherein said processor system further includes a plurality of registers and buffers and wherein said system further includes:

means for copying the content of at least selected ones of said plurality of buffers and registers in response to said initiation of said instruction trace.

12. The system for tracing the execution of a plurality of instructions within a processor system according to claim 9, wherein said performance monitor detects each occurrence of the execution of sixteen instructions.

13. The system for tracing the execution of a plurality of load instructions within a processor system according to claim 9, wherein said performance monitor detects each occurrence of the execution of sixteen load instructions.

14. The system for tracing the execution of a plurality of store instructions within a processor system according to claim 9, wherein said performance monitor detects each occurrence of the execution of sixteen store instructions.

* * * * *